United States Patent [19]
Moore et al.

[11] Patent Number: 5,541,830
[45] Date of Patent: Jul. 30, 1996

[54] AEROSPACE DC POWER SUPPLY HAVING NEUTRAL POINT CONTROLLER

[75] Inventors: Terrence W. Moore, Troy, Ohio;
Harold G. Carlson, Apalchin, N.Y.;
Robert R. Hanson, Dayton; Kory K. Evanson, Vandalia, both of Ohio

[73] Assignee: Leland Electrosystems, Inc., Vandalia, Ohio

[21] Appl. No.: 366,252

[22] Filed: Dec. 29, 1994

[51] Int. Cl.⁶ .................................................. H02M 7/145
[52] U.S. Cl. ................... 363/69; 363/64; 363/129
[58] Field of Search ........................ 363/3, 5, 6, 64, 363/69, 70, 128, 129

[56] References Cited

U.S. PATENT DOCUMENTS

| | | | |
|---|---|---|---|
| 3,641,419 | 2/1972 | Koltuniak et al. | 321/8 C |
| 4,208,709 | 6/1980 | Garnham et al. | 363/90 |
| 4,739,466 | 4/1988 | Glennon et al. | 363/89 |
| 5,446,643 | 8/1995 | McMurray | 363/40 |

OTHER PUBLICATIONS

Dewan et al., *Power Semiconductor Units*, A Wiley-Interscience Publication, John Wiley & Sons, Copyright 1975, pp. 156–161.

Larson, *Power-Control Electronics*, Prentice-Hall, Inc., Copyright 1983, pp. 101–131.

*Primary Examiner*—Peter S. Wong
*Assistant Examiner*—Bao Q. Vu
*Attorney, Agent, or Firm*—Killworth, Gottman, Hagan & Schaeff

[57] ABSTRACT

Dc aerospace power supplies include neutral point controllers to interconnect primary or secondary windings of the supplies into wye connected primary or secondary circuits. In power supplies having neutral point controllers in the primary circuits, the power supplies may alternately or in addition have first and second compound wye connected secondary circuits having a separate or common neutral point.

24 Claims, 10 Drawing Sheets

AEROSPACE DC POWER SUPPLY HAVING NEUTRAL POINT CONTROLLER

BACKGROUND OF THE INVENTION

The present invention relates in general to aerospace direct current (dc) power supplies and, more particularly, to an improved aerospace dc power supply wherein a neutral point controller including a full or partial controlling bridge and/or multiple wye and/or delta connected secondary circuits are used to convert alternating current (ac) power to dc power in an aerospace environment.

Early aircraft electrical systems operated on low voltage dc power, such as 6, 12 or 28 volts. Such systems permitted the use of commonly available batteries and accessories such as lighting fixtures to be used on aircraft. A generator was driven by an aircraft engine to charge the battery system. While some of these generators produced electrical noise, the battery system served as a large filter capacitance and attenuated the generator noise.

The advent of electrical instrumentation such as radios increased the amount of power required on the aircraft. Often, the added power demands of radios could be handled by the low voltage dc power systems in spite of the modest capabilities of distribution systems for low voltage dc power. However, when electric motors and other higher powered equipment began to appear on aircraft, the use of low voltage dc power and the required low voltage dc power distribution system became impractical. Even a modest amount of power such as 6 kilowatts (KW) required large, heavy, and inflexible cables to carry currents in excess of 200 amperes. Accordingly, ac aircraft power systems distributing power at 115 volts ac, 3 phase and 400 hertz (Hz) begin to emerge. The ac systems permitted power to be easily distributed and switched and the use of 400 Hz allowed electromagnetic devices such as motors and transformers to remain of modest size and weight.

Unfortunately, there is a problem in using an ac electrical system in that ac power is more difficult to produce and store than dc power. As a result, there has been a segregation of electrical equipment into loads that are imperative for the safety of flight of the aircraft from loads that are not essential. Safety of flight loads have remained as low voltage dc loads, such as the conventional 28 volt dc, which have access to power from a battery system should the engine mounted generators fail to operate.

While it is possible to have both ac and dc generators on an aircraft engine, the common practice is to use only ac generators. The use of only ac generators eliminates the need for heavy gauge feeder conductors in the wings and nacelles of an aircraft which would be required for high levels of dc power. Dc power, such as the conventional 28 volts dc, is converted from the ac power. The most common means for converting ac power into dc power is a transformer-rectifier (T-R) circuit.

The transformer receives ac power, such as three phase, 115 volts ac at 400 Hz, and drops the voltage to about 25 volts ac, line to line, at 400 Hz. The rectifiers then convert the low voltage ac into low voltage dc. Usually, such systems include filtering on both the input and output sides to attenuate most electromagnetic emissions conducted to the ac and dc electrical busses.

The simple transformer-rectifier has no active means for regulation of its output voltage which will vary in accordance with an applied load. The primary causes for the variations are the resistance voltage drops in the transformer windings, increases in voltage drop through the rectifiers with increased load, voltage drops in the ac feeders to the transformer-rectifier and voltage drops in the conductors carrying the power from the T-R circuit to the loads. In a typical aircraft power system the voltage from the transformer-rectifier may be 28 volts dc at 5 amperes of load, but may drop to 24 volts dc at 150 amperes of load.

A problem which arises with a system using a simple transformer-rectifier circuit is the loss of applied voltage to the battery. For example, a 24 volt battery system should be charged at about 28 volts dc to maintain proper charge and capacity. A system where the battery is maintained at 24 volts dc will lose capacity over time, and therefor reduce the amount of time the aircraft can continue to fly without engine generator power while the essential loads are powered by the battery system.

As an alternative, some development efforts have been applied to switch mode power supplies. Such power supplies are very complicated and of low reliability. And they tend to be expensive and inefficient converters of energy.

Another solution is to use a phase control bridge on the high voltage side of the transformer-rectifier circuit. This is preferable in systems where regulation is desired and cost is to be held down. The bridge is fully controlled using 6 thyristors or silicon controlled rectifiers (SCR's), arranged in three forward and reverse conducting pairs.

A neutral point controller is a simplified version where instead of using 6 controlled rectifiers arranged into conducting pairs, three controlled rectifiers are arranged in a ring, anode to cathode. This reduces the number of power control devices to three, no diodes or controlled rectifiers are needed to conduct in the reverse direction, less driver circuitry is required, reliability is improved, and waste heat rejection is lowered.

Frequently, this circuit includes a wye connected primary winding circuit which is magnetically coupled to both a wye connected secondary winding circuit and a delta connected secondary winding circuit. The wye and delta connected secondary winding circuits provide line to line voltages which are instantaneously displaced by 30° electrical such that the voltages alternately peak to form twelve pulses per full power cycle. This results in a lower ripple output voltage.

Unfortunately, while twelve pulses per full power cycle are produced during substantially full conduction, as the conduction angle is reduced for smaller loads, the power output converges to three pulses per full power cycle hence raising the ripple output voltage. In addition, the delta connected secondary winding provides a path for circulating currents.

There is an ongoing need for improved aerospace dc power supplies which overcome the problems of the prior art and also which provide alternate configurations better adapted for specific applications. Such improvements not only serve to enrich the art but also to provide more efficient and reliable supplies for the aerospace industry.

SUMMARY OF THE INVENTION

This ongoing need is currently met by the dc aerospace power supplies of the present invention wherein neutral point controllers are utilized in power supplies to interconnect primary or secondary windings of the supplies into wye connected primary or secondary circuits. It is currently preferred to utilize full bridge neutral point controllers; however, half bridge neutral point controllers can also be used. In addition or alternatively, the power supplies may have first and second wye connected secondary circuits.

In accordance with one aspect of the present invention, an aerospace dc power supply comprises three primary winding coils for receiving three phase ac input power. Three pairs of controlled rectifiers are connected into anti-parallel pairs with the three pairs of controlled rectifiers being connected into a delta configuration for interconnecting the three primary winding coils into a wye connected primary circuit. The delta connected pairs of controlled rectifiers defines the neutral point of the wye connected primary circuit. At least one secondary circuit is magnetically coupled to the wye connected primary circuit and a half or full wave bridge circuit is connected to each of the at least one secondary circuit. A dc output circuit is connected to the bridge circuits. The power supply may comprise a delta connected secondary circuit and a wye connected secondary circuit. Depending upon the embodiment, the dc output circuit may comprise an output capacitor alone or an output capacitor and an interphase transformer connected between the bridge circuits of the power supply.

Preferably, the aerospace dc power supply comprises first and second wye connected secondary circuits wherein each leg of each of the first and second wye connected secondary circuits comprises windings associated with two of the three primary winding coils. The first and second wye connected circuits can have separate neutral points or a common neutral point wherein each of the first and second wye connected circuits include common secondary windings.

In accordance with another aspect of the present invention, an aerospace dc power supply comprises a three phase transformer core defining three magnetically coupled paths. Three primary winding coils for receiving three phase ac input power are separately wound onto the three magnetically coupled paths. Three pairs of anti-parallel connected controlled rectifiers are connected into a delta configuration for interconnecting the three primary winding coils into a wye connected primary circuit. The delta connected pairs of controlled rectifiers define the neutral point of the wye connected primary circuit. At least two secondary circuits are magnetically coupled to the wye connected primary circuit. A half or full wave bridge circuit is connected to each of the at least two secondary circuits and to a dc output circuit.

In accordance with still another aspect of the present invention, an aerospace dc power supply comprises three primary winding coils for receiving three phase ac input power. Three controlled rectifiers are arranged in a ring, anode to cathode, for interconnecting the three primary winding coils into a wye connected primary circuit. The three controlled rectifiers define the neutral point of the wye connected primary circuit. At least first and second wye connected secondary circuits are magnetically coupled to the wye connected primary circuit. A half or full wave bridge circuit is connected to each of the at least first and second wye connected secondary circuits and to a dc output circuit.

In accordance with yet another aspect of the present invention, an aerospace dc power supply comprises three wye connected primary winding coils for receiving three phase ac input power. At least one secondary circuit is magnetically coupled to the wye connected primary circuit, the at least one secondary circuit comprising three secondary winding coils. A neutral point controller interconnects the three secondary winding coils into a wye connected secondary circuit, with the neutral point controller defining the neutral point of the wye connected secondary circuit. A full wave bridge circuit is connected to each of the at least one secondary circuit and to a dc output circuit.

It is thus an object of the present invention to provide an improved dc aerospace power supply wherein the primary winding circuit includes a full bridge neutral point controller, and to provide an improved dc aerospace power supply wherein the secondary windings comprise at least two compound wye connected secondary windings with each compound wye connected secondary circuit being associated with two power phases.

Other objects and advantages of the invention will be apparent from the following description, the accompanying drawings and the appended claims.

DETAILED DESCRIPTION OF THE INVENTION

Figure 1:
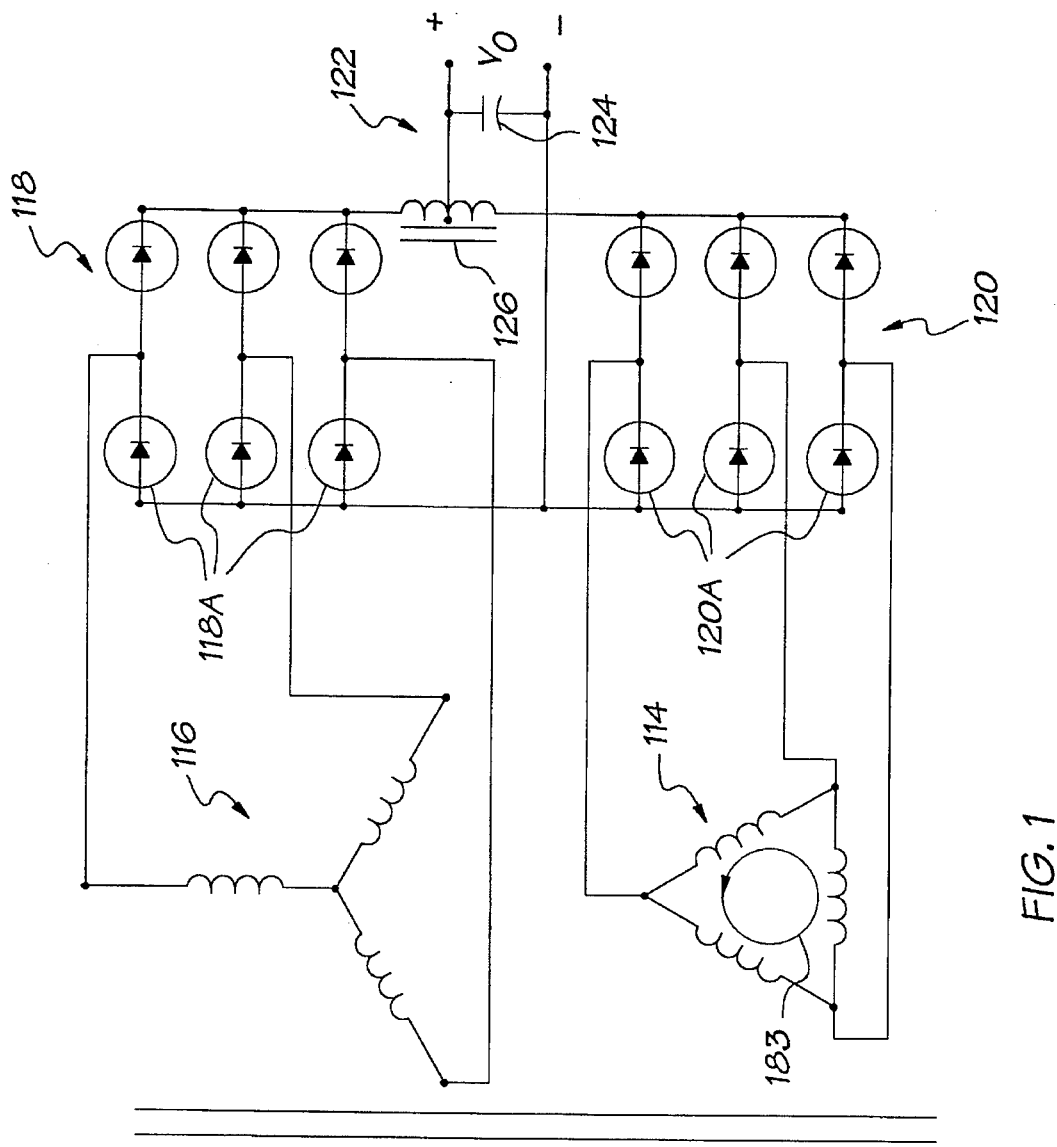
FIG. 1 is a schematic diagram of a first embodiment of an aerospace dc power supply in accordance with the present invention.
Figure 1:
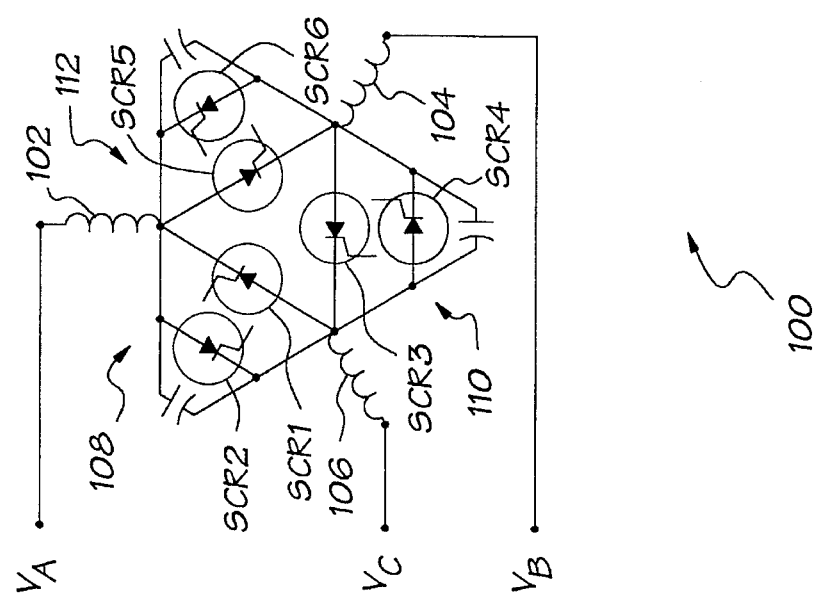

The invention of the present application will now be described with reference to the drawings wherein FIG. 1 schematically illustrates a first embodiment of an aerospace dc power supply 100 in accordance with the present invention. As shown, the supply includes three primary winding coils 102, 104, 106 for receiving three phase ac input power $V_A$, $V_B$ and $V_C$. Three pairs of controlled rectifiers 108, 110, 112 are connected anti-parallel to one another and, in turn, the three pairs of controlled rectifiers are connected to each other in a delta configuration. The delta connected pairs of controlled rectifiers 108, 110, 112 serve to interconnect the three primary winding coils 102, 104, 106 into a wye connected primary circuit by defining the neutral point of the wye connected primary circuit. Thus, FIG. 1 illustrates a neutral point controller including a full bridge defined by the pairs of controlled rectifiers 108, 110, 112, i.e. a full bridge neutral point controller.

The embodiment of the power supply 100 of FIG. 1 includes two secondary winding circuits, a delta connected secondary circuit 114 and a wye connected secondary circuit 116, magnetically coupled to the wye connected primary circuit. A first full wave bridge circuit 118 is connected to the wye connected secondary winding circuit 116 and a second full wave bridge circuit 120 is connected to the delta connected secondary winding circuit 114. A half wave bridge circuit can be used in the power supply 100 if the delta connected winding 114 is converted to a wye connected winding and the negative conduction diodes 118A, 120A are eliminated which will reduce voltage loss across the bridge circuits and reduce heat dissipation as should be apparent and as will be more fully described with reference to FIG. 10. The negative side of the first and second bridge circuits 118, 120 are connected together and to one side of a dc output circuit 122 and the positive side of the first and second bridge circuits 118, 120 are connected to the other side of the dc output circuit 122. The dc output circuit delivers dc output power at an output voltage $V_O$.

As illustrated in FIG. 1, the dc output circuit comprises an output capacitor 124 and an interphase transformer 126. The interphase transformer is a known circuit element which forces the instantaneous currents of the first and second full wave bridge circuits 118, 120 to be shared between the bridge circuits. Also, the inductance of the interphase transformer forms an L-C filter with the output capacitor 124.

Figure 2:
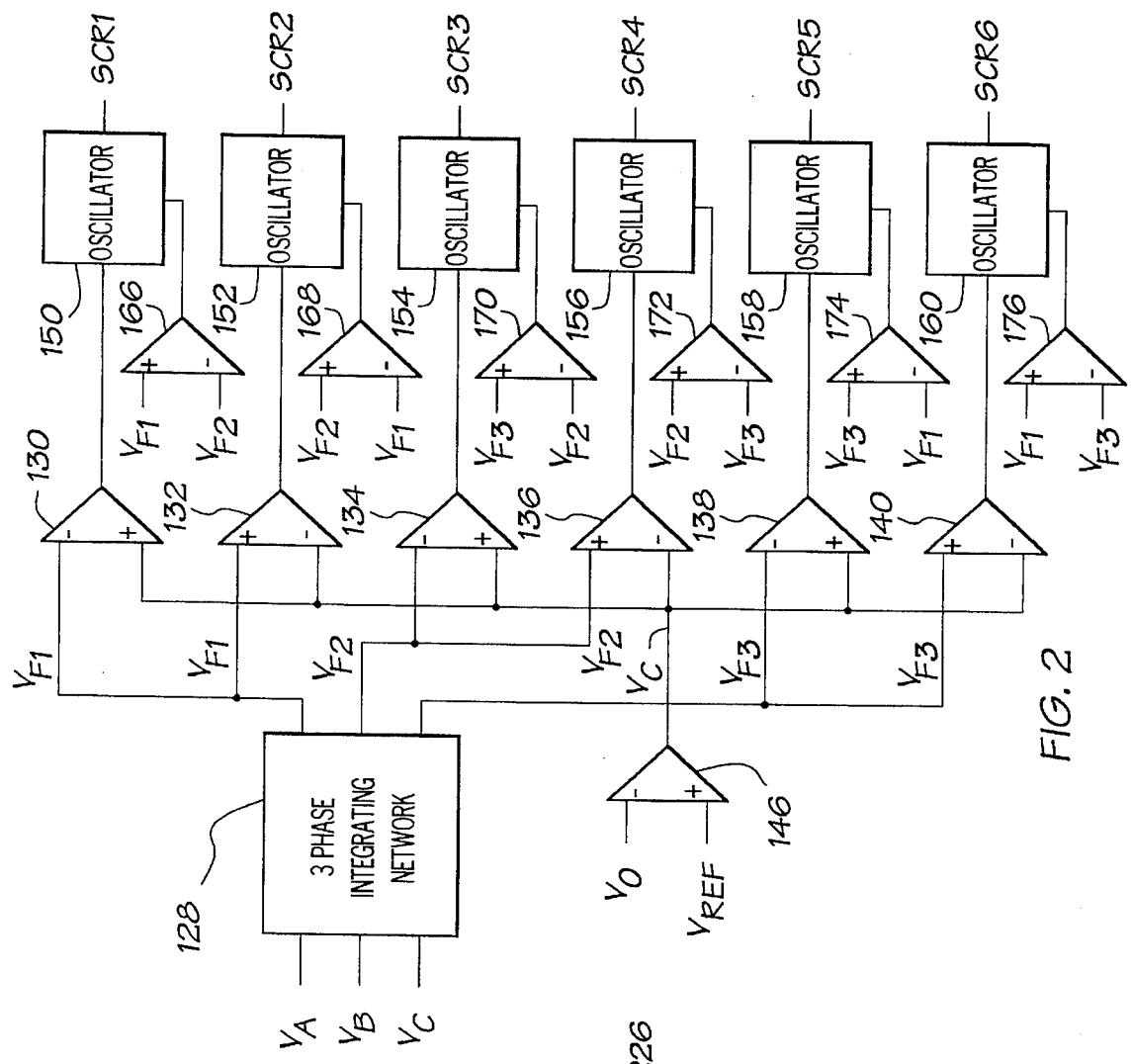
FIG. 2 is a schematic block diagram of a circuit for controlling a full bridge neutral point controller as used in the present invention.

FIG. 2 is a schematic block diagram of a circuit for controlling the three pairs of controlled rectifiers 108, 110, 112 which make up the full bridge neutral point controller of the circuit of FIG. 1. The three phase power, $V_A$, $V_B$ and $V_C$, is passed to a three phase integrating network 128, such as an RC integrating network, which generates signals $V_{F1}$, $V_{F2}$ and $V_{F3}$ representative of the integral of the phase-to-phase voltages of each of the phases, A, B and C. The phase-to-phase voltages $V_{A-B}$, $V_{B-C}$ and $V_{C-A}$ are applied across the neutral point SCR's and thus are the biases across each SCR pair. Each of the voltage waveforms of the three phase power $V_{A-B}$, $V_{B-C}$ and $V_{C-A}$, is defined to be a sine wave 142 such that its integral, $V_{F1}$, $V_{F2}$ or $V_{F3}$, is a cosine wave 144, see FIG. 7.

The cosine waves $V_{F1}$, $V_{F2}$ and $V_{F3}$ are compared to a control signal $V_C$ by comparator circuits 130-140 to generate enable signals for firing the pairs of controlled rectifiers 108, 110, 12 (SCR1 & SCR2, SCR3 & SCR4, SCR5 & SCR6). The control signal $V_C$ is generated by an amplifier circuit connected as a comparator circuit 146 which compares the output voltage $V_O$ of the power supply to a reference voltage $V_{REF}$.

Figure 7:
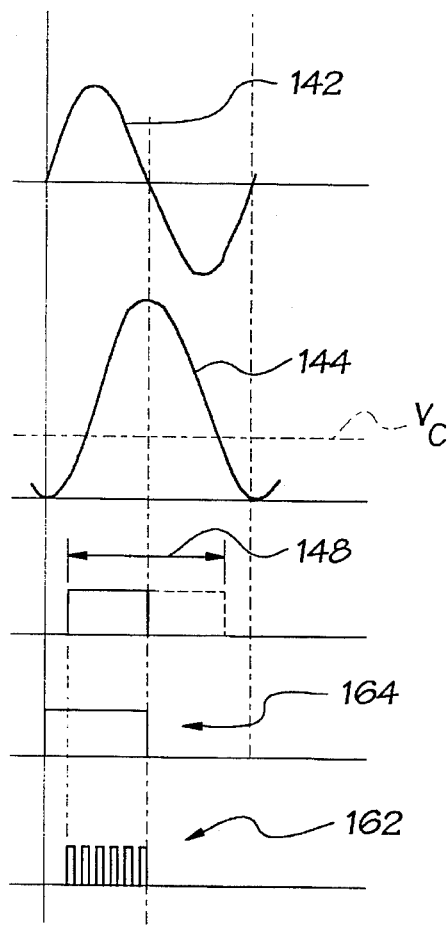
FIG. 7 graphically illustrates signals within the control circuit of FIG. 2.

Each of the controlled rectifiers is enabled during the time 148 that the cosine wave 144 corresponding to the phase-to-phase or line-to-line voltage which is connected across it in a forward direction is greater than the control signal $V_c$, see FIG. 7. Thus, high output signals from the comparators 130-140 enable the oscillator circuits 150-160 which generate high frequency pulse signals 162 for gating the SCR's SCR1-SCR6. High frequency pulse signals are preferred to reduce the power dissipated in the power supply 100 and to reduce the size of pulse transformers which are used to couple the gating signals to the SCR's.

The SCR's SCR1-SCR6 can not be gated on during times that the line-to-line voltage across an SCR is negative. Accordingly, gating pulses applied during those times only represent losses in the power supply 100. To eliminate these superfluous gating pulses, a blanking signal 164 is generated for each of the SCR's during times that the line-to-line voltage across the SCR's are negative. Blanking signals are generated by comparators 166-176 in response to the cosine waves $V_{F1}$, $V_{F2}$ and $V_{VF3}$. The blanking signals from the comparators 166-176 are passed to the oscillator circuits 150-160 to disable the oscillator circuits 150-160 during times that the blanking signals are low, see FIG. 7.

It is noted that the described cosine firing arrangement for the SCR's is currently preferred for operation of power supplies in accordance with the present invention, including the power supply 100. However, a variety of control arrangements can be used to control the SCR's as will be apparent to those skilled in the art.

Figure 3:
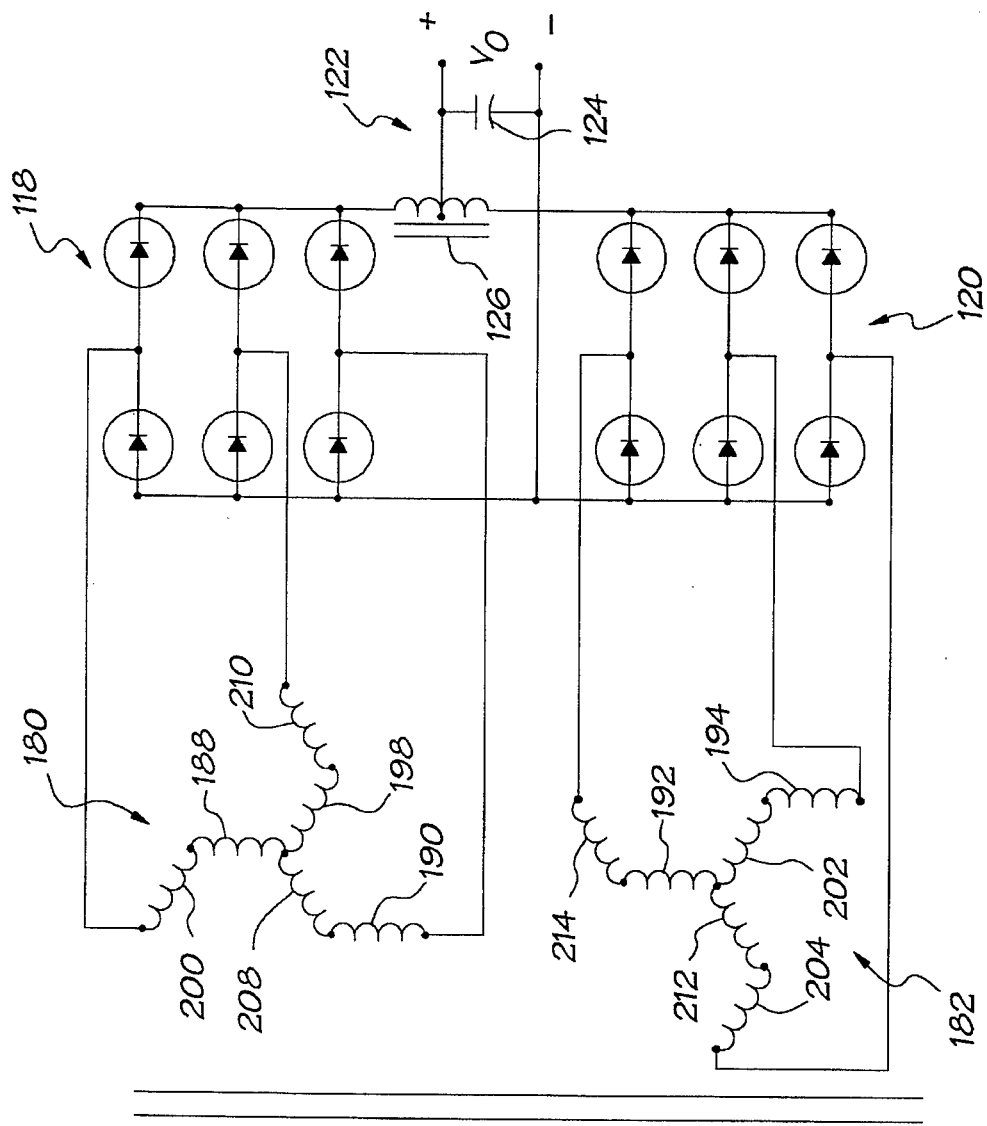
FIG. 3 is a schematic diagram of a second embodiment of an aerospace dc power supply in accordance with the present invention.
Figure 3:
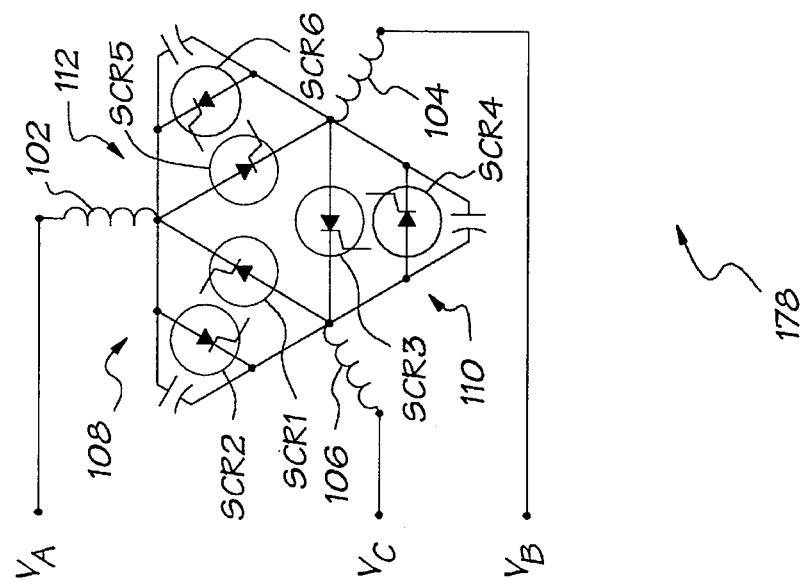

FIG. 3 schematically illustrates a second embodiment of an aerospace dc power supply 178 in accordance with the present invention. A substantial portion of the power supply 178 is the same as the power supply 100 of FIG. 1, accordingly, like elements will be identified by the same reference numerals in FIG. 3. In the second embodiment, the delta connected secondary circuit 114 and the wye connected secondary circuit 116 are replaced with first and second wye connected secondary circuits 180, 182. This configuration eliminates circulating currents represented by the circular arrow 183 in FIG. 1 which can occur in the delta winding 114 of the first embodiment.

Figure 4:
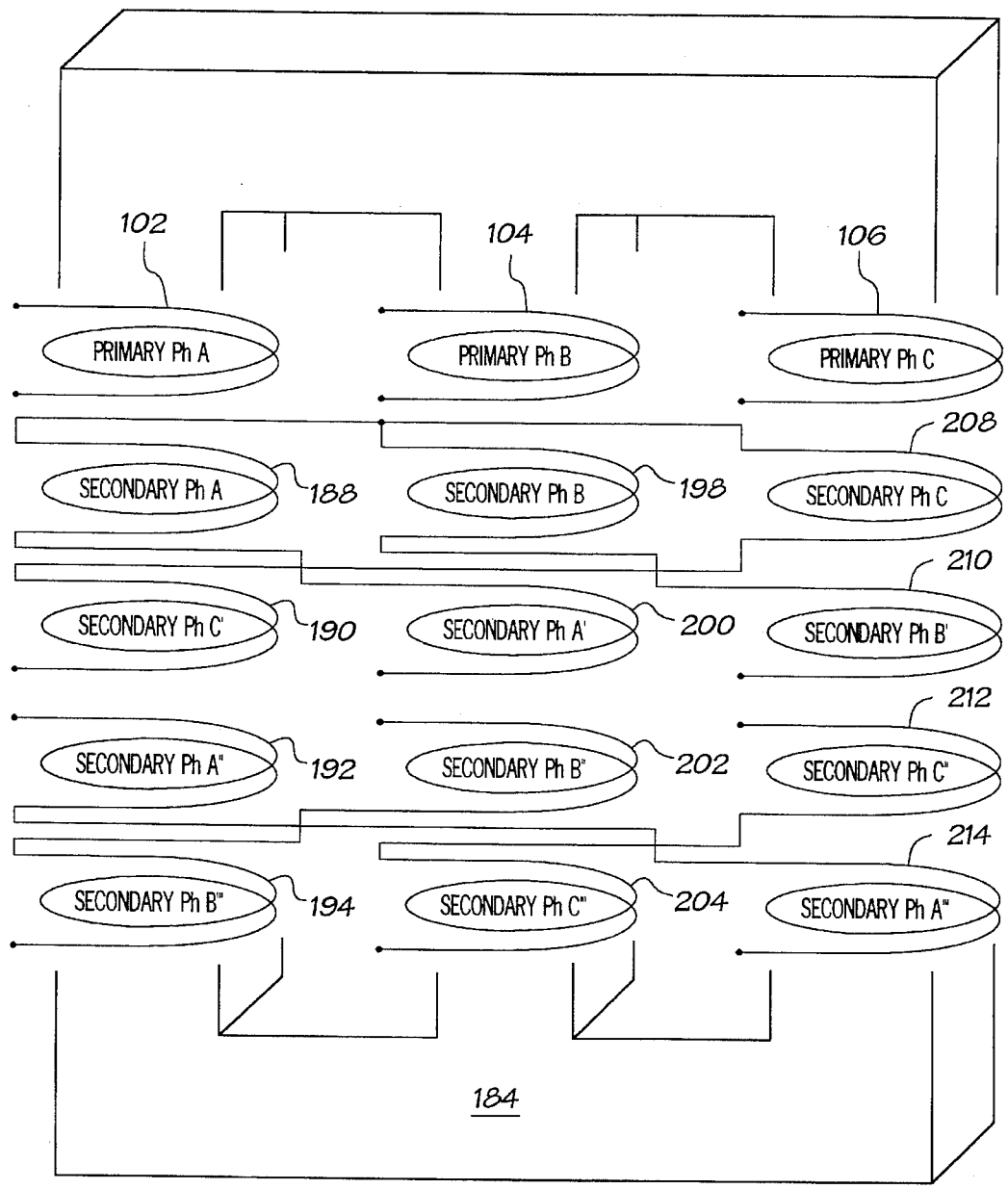
FIG. 4 is a schematic representation of a three phase transformer interconnected for use in the aerospace dc power supply of FIG. 3.

While the first and second wye connected secondary circuits 180, 182 could be constructed using single phase transformers, preferably they are wound on a three phase core 184 as shown in FIG. 4 such that all windings are linked even during the portions of the cycles of the three phase power $V_A$, $V_B$ and $V_C$ which are not conducted to the transformer, or the retard portion of those cycles.

Each leg of the three phase core 184 is wound with one primary winding and four secondary windings. As illustrated in FIG. 4, the left leg is wound with the primary winding 102 for phase A and secondary windings 188-194; the middle leg is wound with the primary winding 104 for phase B and secondary windings 198-204; and, the right leg is wound with the primary winding 106 for phase C and secondary windings 208-214. Connections of the secondary windings 188-194, 198-204, 208-214 to form the first and second wye connected secondary circuits 180, 182 are shown in FIGS. 3 and 4.

Figure 8:
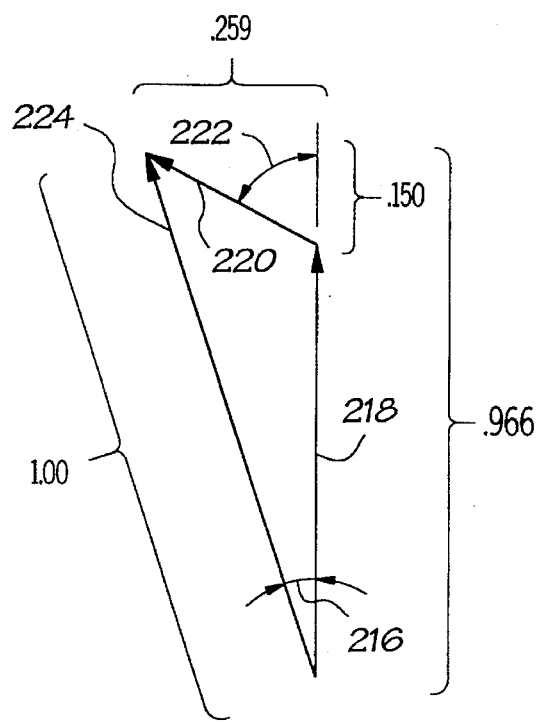
FIG. 8 is a phasor diagram for output voltages from a power supply circuit including dual wye connected secondary winding circuits.

Acceptable turns ratios for the various windings of the three phase transformer included in the second embodiment of the power supply 178 are determined from a phasor diagram representative of the resultant output voltages from the transformer secondaries as shown in FIG. 8. The phasor diagram of FIG. 8 represents the voltages present on the A phase of the secondary winding 180 which is connected to offset its output voltage by 15° from the A phase voltage as represented by the angle 216. Plus and minus 15° offsets results in total displacements of 30° between output phasors which results in the voltages alternately peaking to form twelve pulses per full power cycle.

The phasor 218 from the winding 188 is combined with the phasor 220 from the winding 200 which are displaced from one another by the angle 222 which is 60° to result in the output phasor 224 which is displaced 15° from the phasor 218. If the output phasor 224 is defined as a unit phasor, then the phasor 218 is 0.816 with the components of the phasor 220 being 0.150 and 0.259. From the phasor analysis or geometrically, the turns ratios can be determined to result in the desired outputs. For example: if the secondary windings 188, 198, 208, 192, 202, 212 have 7 turns, the secondary windings 190, 200, 210, 194, 204, 214 would have 2 turns; if the secondary windings 188, 198, 208, 192, 202, 212 have 6 turns, the secondary windings 190, 200, 210, 194, 204, 214 would have 3 turns.

It should be apparent that a large variety of transformer configurations are possible for use in the invention. In fact, alternation in angle between phase groups with respect to each other and with respect to a phase retarded primary can result in an optimum solution for minimizing ripple across the full range of voltage regulation.

Figure 9:
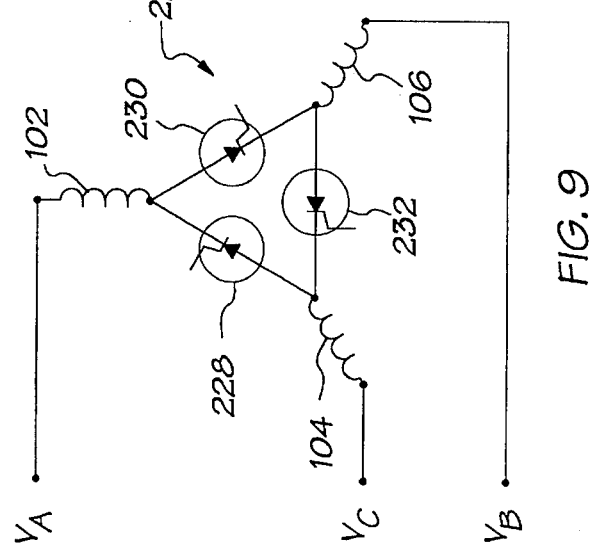
FIG. 9 is a schematic diagram of a primary winding including a simple neutral point controller.

A third embodiment of the present invention can be made by using the dual wye connected secondary circuits, for example the secondary circuits 180, 182 of FIG. 3 with a primary winding having a simple neutral point controller. This primary configuration is shown in FIG. 9 wherein the primary windings 102, 104, 106 are interconnected into a wye configuration by a neutral point controller 226 having SCR's 228, 230, 232 connected anode to cathode into a ring.

Figure 5:
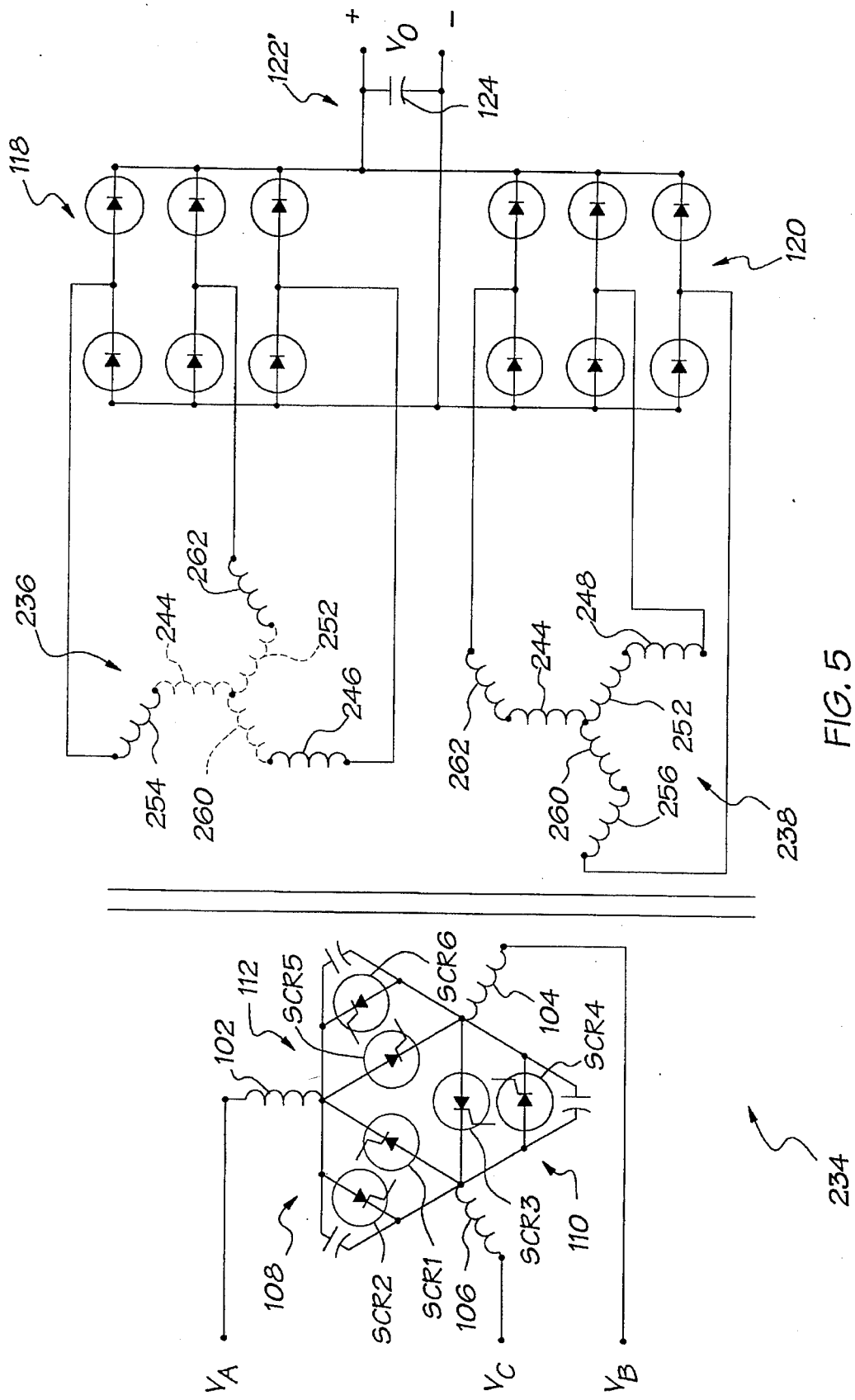
FIG. 5 is a schematic diagram of a third embodiment of an aerospace dc power supply in accordance with the present invention.

FIG. 5 schematically illustrates a fourth embodiment of an aerospace dc power supply 234 in accordance with the present invention. A substantial portion of the power supply 234 is the same as the power supply 100 of FIG. 1, accordingly, like elements will be identified by the same reference numerals in FIG. 5. In the fourth embodiment, the delta connected secondary circuit 114 and the wye connected secondary circuit 116 are replaced with first and second wye connected secondary circuits 236, 238. This configuration eliminates circulating currents represented by the circular arrow 183 in FIG. 1 which can occur in the delta winding 114 of the first embodiment.

Figure 6:
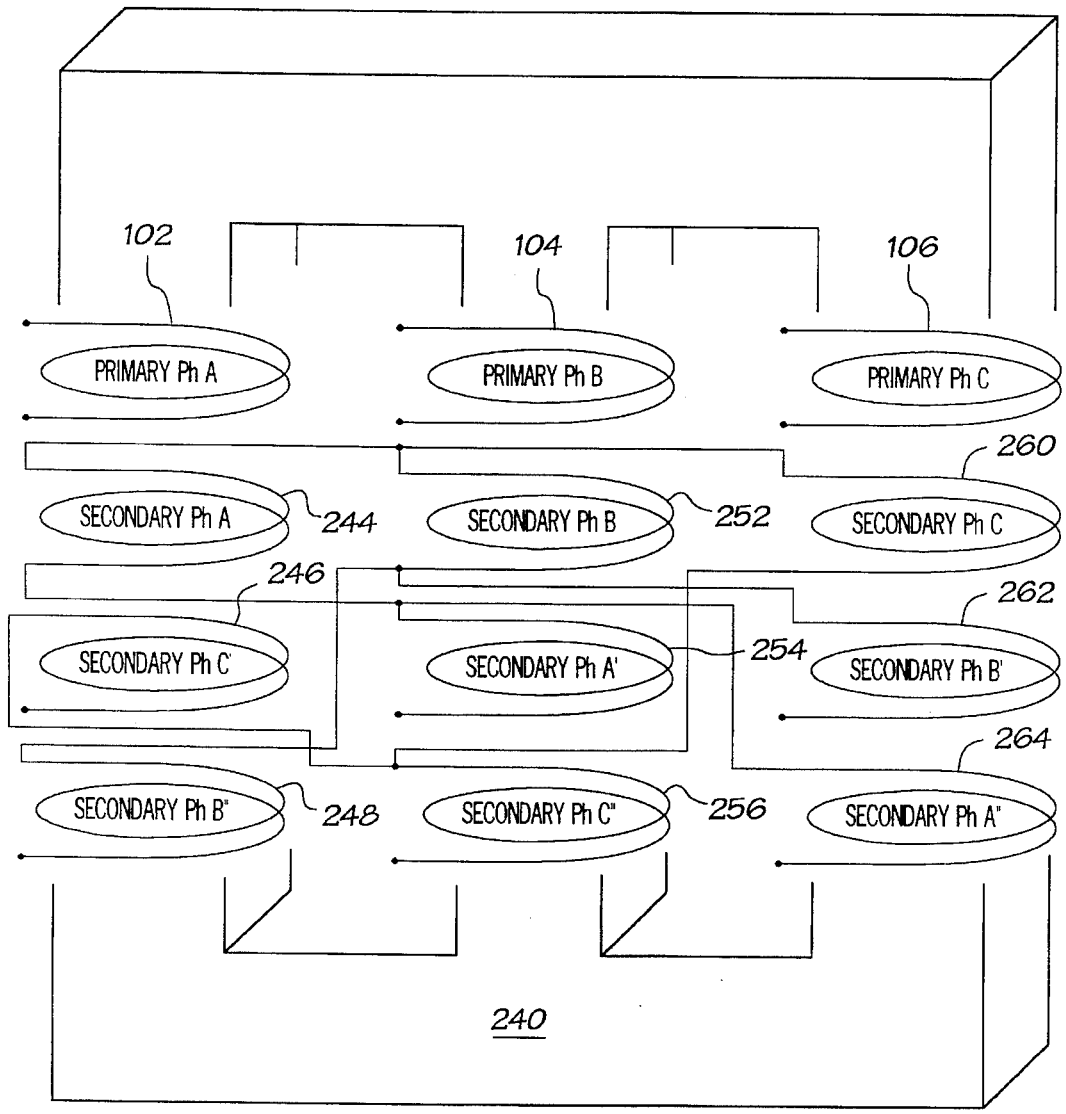
FIG. 6 is a schematic representation of a three phase transformer interconnected for use in the aerospace dc power supply of FIG. 5.

In the power supply 234, the wye connected secondary circuits 236, 238 share the neutral connection such that the power supply 234 utilizes a six phase (star) winding. The first and second wye connected secondary circuits 236, 238 are wound on a three phase core 240 as shown in FIG. 6 such that all windings are linked even during the portions of the cycles of the three phase power $V_A$, $V_B$ and $V_C$ which are not conducted to the transformer, or the retard portion of those cycles.

Each leg of the three phase core 240 is wound with one primary winding and three secondary windings. As illustrated in FIG. 6, the left leg is wound with the primary winding 102 for phase A and secondary windings 244–248; the middle leg is wound with the primary winding 104 for phase B and secondary windings 252–256; and, the right leg is wound with the primary winding 106 for phase C and secondary windings 260–264. Connections of the secondary windings 244–248, 252–256, 260–264 to form the first and second wye connected secondary circuits 236, 238 are shown in FIGS. 5 and 6. In the fourth embodiment, a dc output circuit 122' comprises only the output filter capacitor 124.

Figure 10:
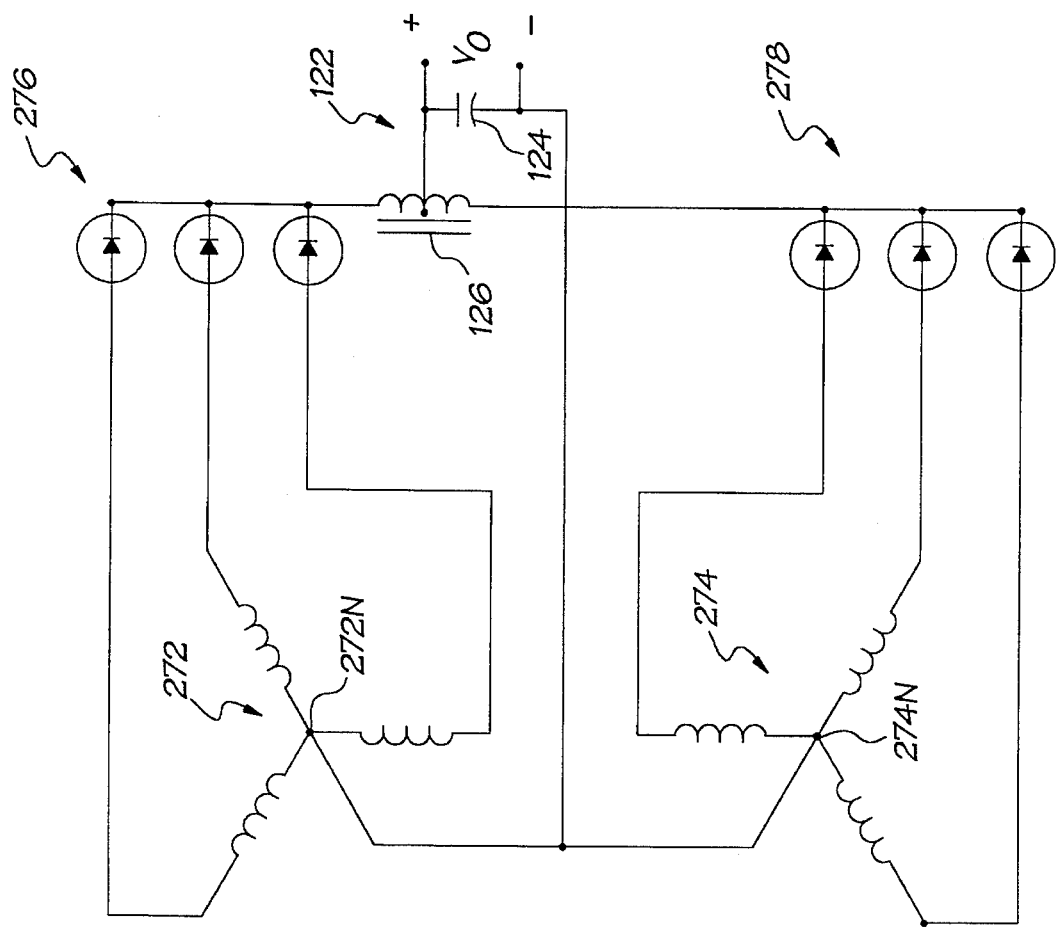
FIG. 10 is a schematic diagram of a fifth embodiment of an aerospace dc power supply in accordance with the present invention.
Figure 10:
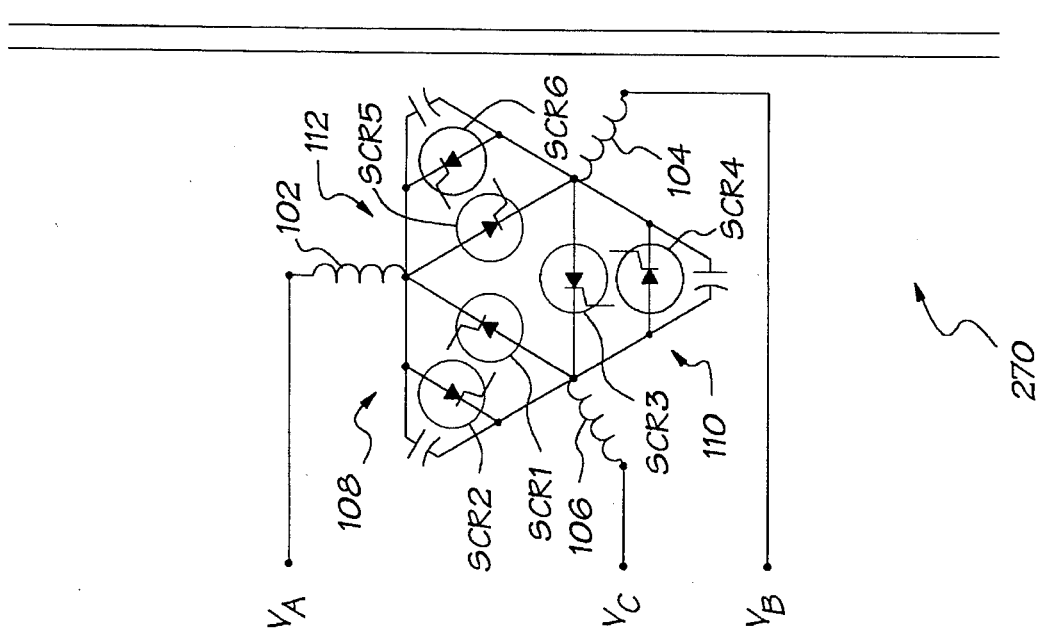

FIG. 10 schematically illustrates a fifth embodiment of an aerospace dc power supply 270 in accordance with the present invention. A substantial portion of the power supply 270 is the same as the power supply 100 of FIG. 1, accordingly, like elements will be identified by the same reference numerals in FIG. 10.

In the fifth embodiment, first and second wye connected secondary windings 272, 274 are magnetically coupled to the wye connected primary circuit defined by the primary winding coils 102, 104, 106. The first and second wye connected secondary windings 272, 274 have a phase relationship relative to one another which is 180° electrical. The neutrals 272N, 274N are connected together and form the negative output of the output voltage $V_O$. This configuration is the same as a six phase star secondary winding configuration. Each of the secondary windings 272, 274 is connected to a half wave rectifier bridge circuit 276, 278. The positive outputs of the half wave bridge circuits 276, 278 are coupled together via the interphase transformer 126 of the output circuit 122.

Figure 11:
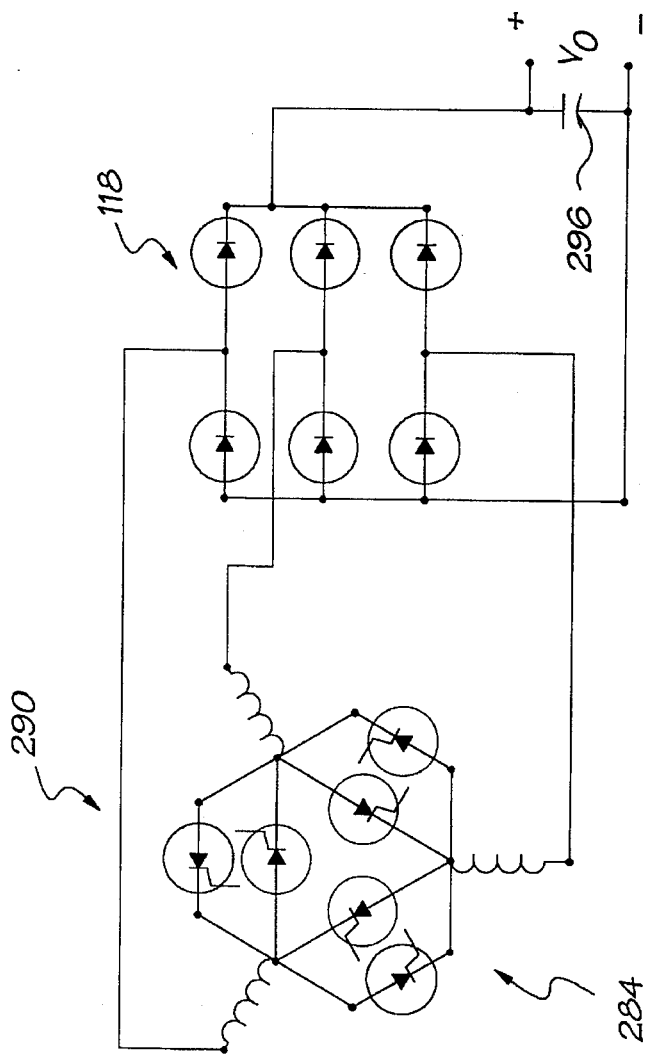
FIG. 11 is a schematic diagram of a sixth embodiment of an aerospace dc power supply in accordance with the present invention wherein a full wave neutral point controller is incorporated in a single wye connected secondary circuit.
Figure 11:
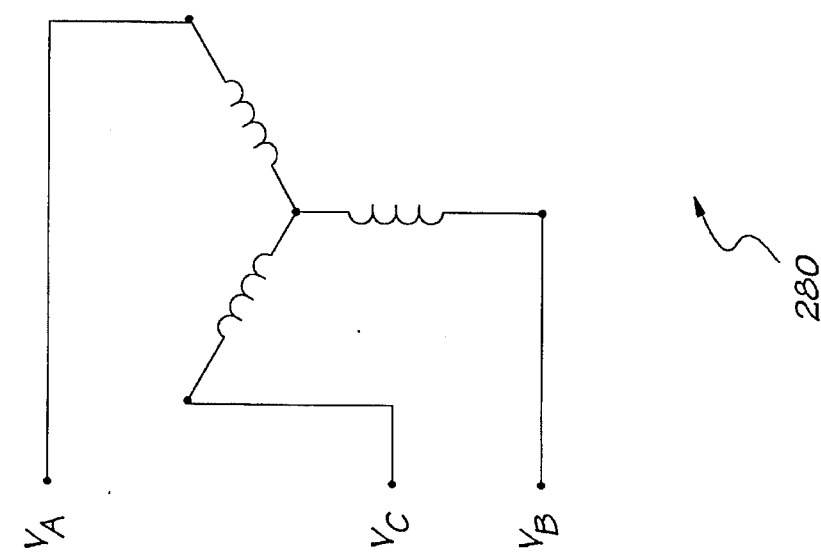
Figure 12:
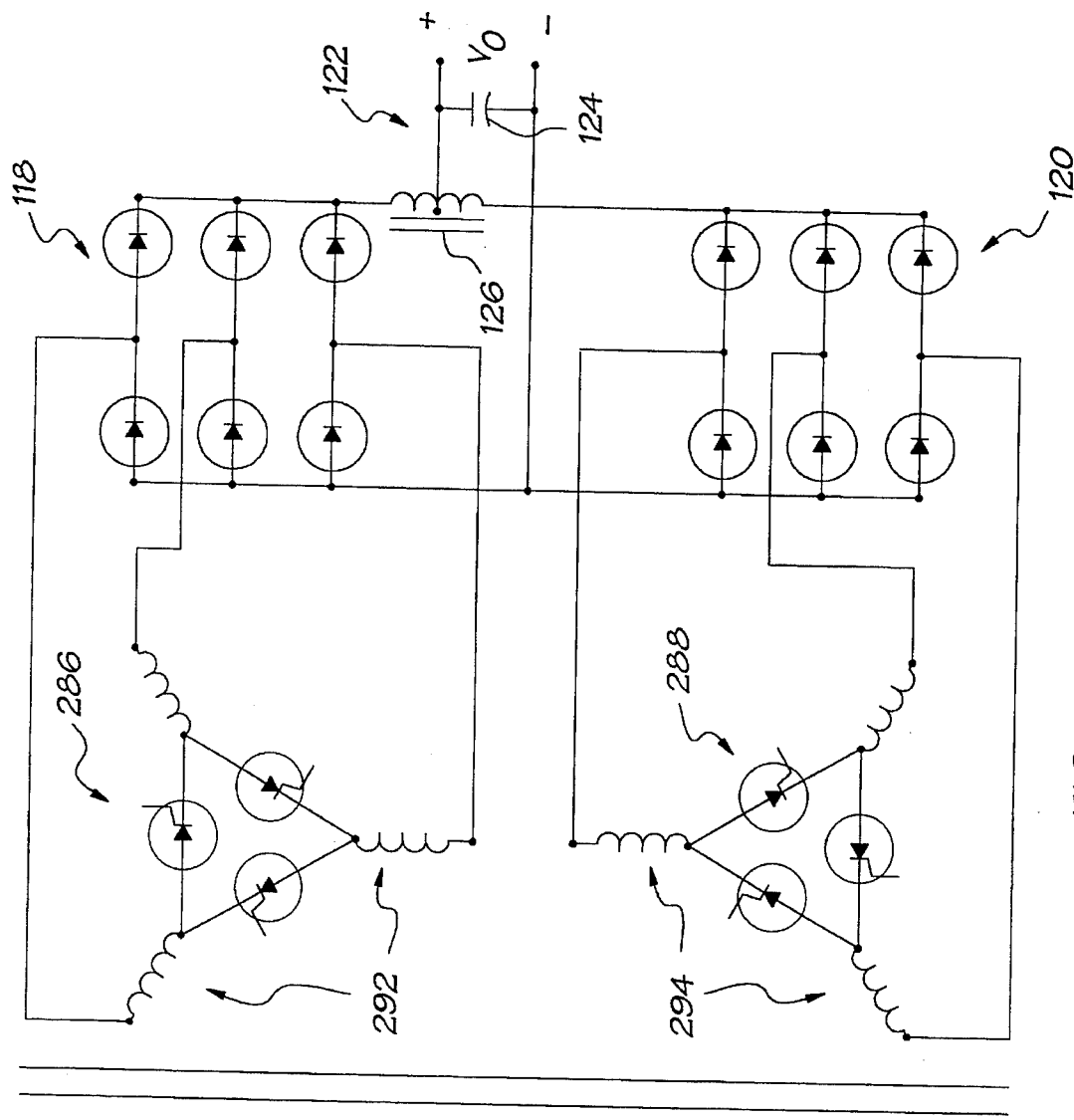
FIG. 12 is a schematic diagram of a seventh embodiment of an aerospace dc power supply in accordance with the present invention wherein half wave neutral point controllers are incorporated into a pair of secondary circuits.
Figure 12:
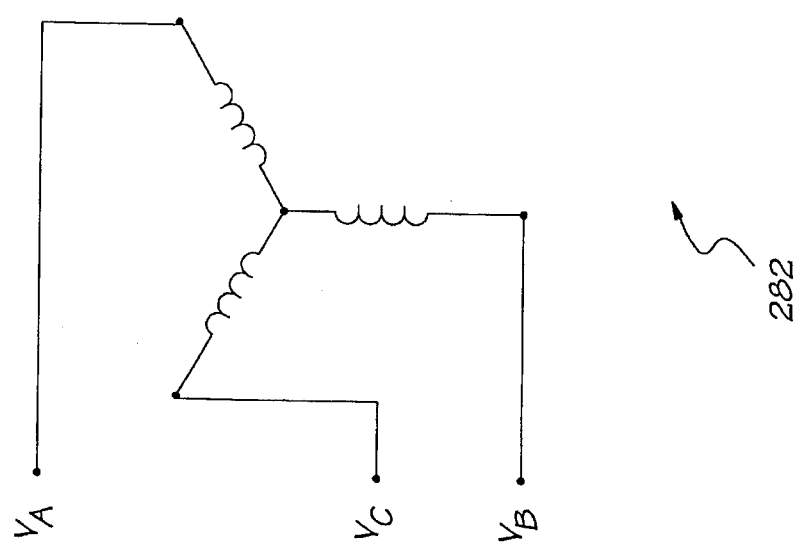

FIGS. 11 and 12 schematically illustrate sixth and seventh embodiments of aerospace dc power supplies 280, 282 in accordance with the present invention. Here again, elements which are the same as those shown in FIG. 1 will be identified by the same reference numerals in FIGS. 11 and 12. In the dc power supplies 280, 282 of FIGS. 11 and 12, neutral point controllers 284, 286, 288 are incorporated into the secondary circuits 290, 292, 294 of the power transformers of the supplies.

In the embodiments of FIGS. 11 and 12, the power transformers are believed to draw a more linear current. These embodiments are particularly suitable for high voltage applications where the output current levels are reduced to levels that approximate the input or primary current levels. An example of such an application is to supply 270 volts dc power for emerging aerospace power applications.

The power supply 280 of FIG. 11 illustrates the full wave neutral point controller 284 for a single wye connected secondary circuit. The neutral point controller 284 operates substantially the same as previously described relative to insertion into a primary circuit. The output of the secondary circuit 290 is connected to the three phase full wave bridge circuit 118 which is in turn connected to an output circuit shown as comprising a filter capacitor 296. Of course other output filter circuitry could be added to reduce output dc ripple.

The power supply 282 of FIG. 12 illustrates incorporation of the half wave neutral point controllers 286, 288 into the secondary circuits 292, 294. In this embodiment, the wye connected secondary circuits 292, 294 are phase shifted by 180°. The outputs of the secondary circuits 292, 294 are connected to the three phase full wave bridges 118, 120. The positive outputs of the full wave bridges 118, 120 are coupled together via the interphase transformer 126 of the output circuit 122.

Having thus described the invention of the present application in detail and by reference to preferred embodiments thereof, it will be apparent that modifications and variations are possible without departing from the scope of the invention defined in the appended claims.

What is claimed is:

1. An aerospace dc power supply comprising:

three primary winding coils for receiving three phase ac input power;

three pairs of controlled rectifiers, each of said pairs being connected anti-parallel to one another with the three pairs of controlled rectifiers being connected into a delta configuration for interconnecting said three primary winding coils into a wye connected primary circuit, said delta connected pairs of controlled rectifiers defining the neutral point of said wye connected primary circuit;

at least one secondary circuit magnetically coupled to said wye connected primary circuit;

a bridge circuit connected to each of said at least one secondary circuit; and a dc output circuit.

2. An aerospace dc power supply as claimed in claim 1 wherein each said bridge circuit comprises a full wave bridge circuit.

3. An aerospace dc power supply as claimed in claim 1 comprising a delta connected secondary circuit and a wye connected secondary circuit.

4. An aerospace dc power supply as claimed in claim 3 wherein said dc output circuit comprises an output capacitor and an interphase transformer connected between a bridge circuit connected to said delta connected secondary circuit and a bridge circuit connected to said wye connected secondary circuit.

5. An aerospace dc power supply as claimed in claim 1 comprising first and second wye connected secondary circuits.

6. An aerospace dc power supply as claimed in claim 5 wherein each leg of each of said first and second wye connected secondary circuits comprises windings associated with two of said three primary winding coils.

7. An aerospace dc power supply as claimed in claim 6 wherein said dc output circuit comprises an output capacitor and an interphase transformer connected between a bridge circuit connected to said first wye connected secondary circuit and a bridge circuit connected to said second wye connected secondary circuit.

8. An aerospace dc power supply as claimed in claim 6 wherein each of said first and second wye connected circuits include common secondary windings.

9. An aerospace dc power supply as claimed in claim 8 wherein said dc output circuit comprises an output capacitor.

10. An aerospace dc power supply comprising:

a three phase transformer core defining three magnetically coupled paths;

three primary winding coils for receiving three phase ac input power, each of said three primary winding coils being wound onto one of said three magnetically coupled paths;

three pairs of controlled rectifiers, each of said pairs being connected anti-parallel to one another with the three pairs of controlled rectifiers being connected into a delta configuration for interconnecting said three primary winding coils into a wye connected primary circuit, said delta connected pairs of controlled rectifiers defining the neutral point of said wye connected primary circuit;

at least two secondary circuits magnetically coupled to said wye connected primary circuit;

a bridge circuit connected to each of said at least two secondary circuits; and a dc output circuit.

11. An aerospace dc power supply as claimed in claim 10 wherein each bridge circuit comprises a full wave bridge circuit.

12. An aerospace dc power supply as claimed in claim 10 comprising two wye connected secondary circuits.

13. An aerospace dc power supply as claimed in claim 12 wherein each leg of each of said two wye connected secondary circuits comprises windings wound upon two of said three magnetically coupled paths and associated with two of said three primary winding coils.

14. An aerospace dc power supply as claimed in claim 13 wherein said dc output circuit comprises an output capacitor and an interphase transformer connected between a full wave bridge circuit connected to one of said two wye connected secondary circuits and a full wave bridge circuit connected to another of said two wye connected secondary circuits.

15. An aerospace dc power supply as claimed in claim 13 wherein each of said two wye connected secondary circuits include common secondary windings.

16. An aerospace dc power supply as claimed in claim 15 wherein said dc output circuit comprises an output capacitor.

17. An aerospace dc power supply comprising:

three primary winding coils for receiving three phase ac input power;

three controlled rectifiers arranged in a ring, anode to cathode, for interconnecting said three primary winding coils into a wye connected primary circuit, said three controlled rectifiers defining the neutral point of said wye connected primary circuit;

at least first and second wye connected secondary circuits magnetically coupled to said wye connected primary circuit;

a bridge circuit connected to each of said at least first and second wye connected secondary circuits; and a dc output circuit.

18. An aerospace dc power supply as claimed in claim 17 wherein each bridge circuit comprises a full wave bridge circuit.

19. An aerospace dc power supply as claimed in claim 17 wherein each leg of each of said first and second wye connected secondary circuits comprises windings associated with two of said three primary winding coils.

20. An aerospace dc power supply as claimed in claim 19 wherein said dc output circuit comprises an output capacitor and an interphase transformer connected between a bridge circuit connected to said first wye connected secondary circuit and a bridge circuit connected to said second wye connected secondary circuit.

21. An aerospace dc power supply as claimed in claim 19 wherein each of said first and second wye connected circuits include common secondary windings.

22. An aerospace dc power supply as claimed in claim 21 wherein said dc output circuit comprises an output capacitor.

23. An aerospace dc power supply comprising:

three wye connected primary winding coils for receiving three phase ac input power;

at least one secondary circuit magnetically coupled to said wye connected primary circuit, said at least one secondary circuit comprising three secondary winding coils;

a neutral point controller for interconnecting said three secondary winding coils into a wye connected secondary circuit, said neutral point controller defining the neutral point of said wye connected secondary circuit;

a full wave bridge circuit connected to each of said at least one secondary circuit; and a dc output circuit.

24. An aerospace dc power supply as claimed in claim 23 wherein said neutral point controller comprises three pairs of controlled rectifiers, each of said pairs being connected anti-parallel to one another with the three pairs of controlled rectifiers being connected into a delta configuration for interconnecting said three secondary winding coils into a wye connected secondary circuit, said delta connected pairs of controlled rectifiers defining the neutral point of said wye connected secondary circuit.

* * * * *